United States Patent

[11] 3,593,636

[72] Inventor Irving Erlichman
 Wayland, Mass.
[21] Appl. No. 824,098
[22] Filed May 13, 1969
[45] Patented July 20, 1971
[73] Assignee Polaroid Corporation
 Cambridge, Mass.

[54] CAMERA LOADING DOOR AND RELEASE MEANS THEREFOR
 9 Claims, 6 Drawing Figs.
[52] U.S. Cl. .................................................... 95/39, 95/11 R, 95/13
[51] Int. Cl. .................................................... G03b 17/04, G03b 17/52, G03b 17/00
[50] Field of Search .......................................... 95/13, 39

[56] References Cited
 UNITED STATES PATENTS
Re. 25,167 8/1962 Booth et al. .................. 95/39 X
2,054,035 9/1936 Crumrine ..................... 95/39

*Primary Examiner*—Samuel S. Matthews
*Assistant Examiner*—Michael L. Gellner
*Attorneys*—Brown and Mikulka, Robert E. Corb and Alfred E. Corrigan ABSTRACT: A compact folding camera including a housing having a plurality of sections, one of which includes a reflector. The sections are coupled to each other for movement between extended and folded positions and at least a portion of one of the housing sections is movable to an open position to permit loading of film into the camera. In the folded position of the camera, the reflector is located close to means for supporting the film so as to be readily accessible and subject to damage when the section is opened for loading. A release is provided which can only be actuated to open the section for loading when the housing sections are not in the folded position, thereby insuring that the reflector is spaced from the support means.

3,593,636
SHEET 1 OF 3
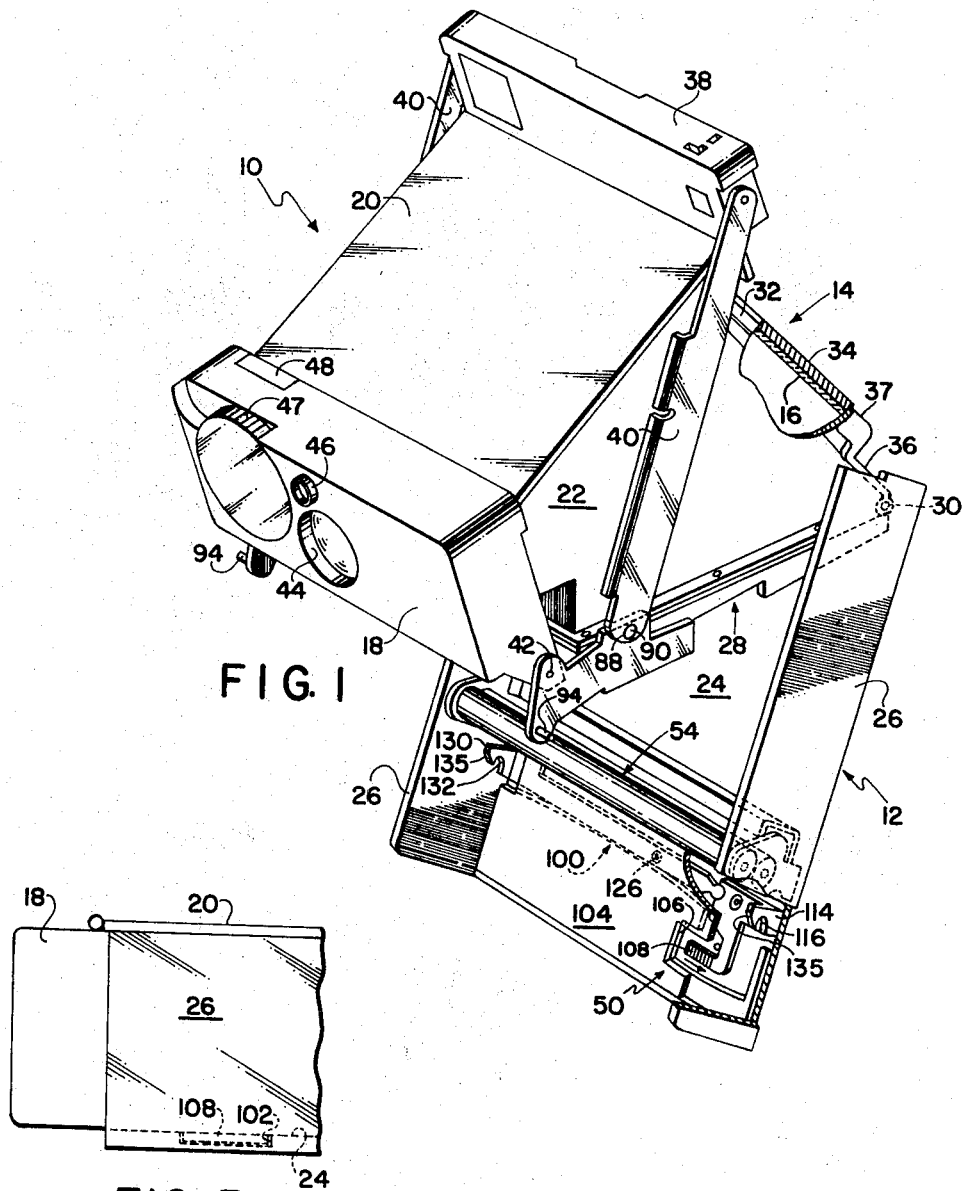
FIG. 1
FIG. 3
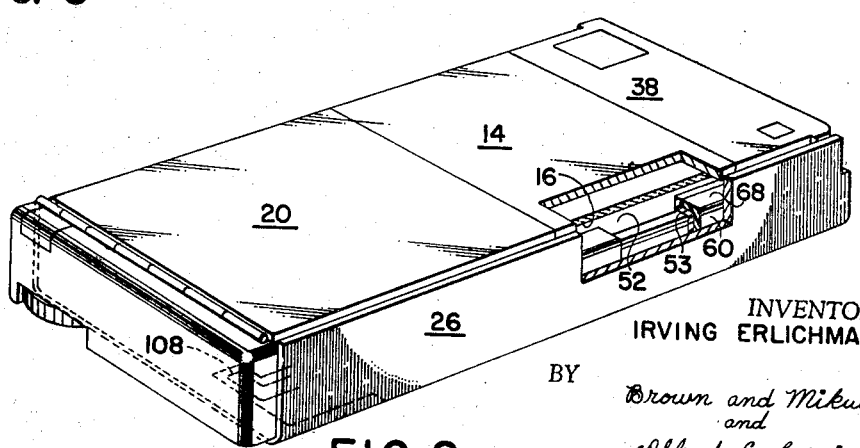
FIG. 2
INVENTOR.
IRVING ERLICHMAN
BY
Brown and Mikulka
and
Alfred E. Corrigan
ATTORNEYS

CAMERA LOADING DOOR AND RELEASE MEANS THEREFOR

The present invention is concerned with a folding camera of the self-developing type which is adapted for use with a film pack including a plurality of photosensitive elements or film units each comprising all of the materials required to produce a photographic print when the film unit is processed subsequent to exposure. A camera of this type includes a housing comprising a section at least a portion of which functions as a closure means to provide access to the interior of the housing, another section pivotally connected to the first-mentioned section and including a lens and shutter, still another section pivotally connected to the first-mentioned section near the end thereof opposite the lens and shutter and including a reflector, e.g., a mirror, for reflecting light from the lens toward a photosensitive element, a support member for supporting the photosensitive element in position for exposure and an erecting system including a rangefinder-viewfinder for moving the various sections between an erect, operative position and a compact, folded position.

Folding cameras of the foregoing type are usually loaded with a film pack containing a plurality of photosensitive elements while the camera is in its folded position. The usual procedure is to open the loading door or closure means of the camera while the camera is in the folded position, remove the expired film pack from its position in engagement with the support member, insert a new film pack into engagement with the support member and finally close the loading door. The various sections of the camera are then moved to their extended positions and the camera is now ready for use. However, it should be noted that when a camera of the foregoing type is in the folded position, the reflector or mirror mounted on one of the sections of the camera lies closely adjacent to and in superposed relation with the support member of the camera which supports the film pack in position for exposure. It is possible due to the close proximity of the support member and the reflector or mirror in the latter position that the reflector or mirror could be scratched or cracked by the film pack inadvertently contacting the mirror upon insertion of the film pack into engagement with the support member.

An object of the invention is to provide in a camera of the foregoing type including a housing section having a support member for supporting a photosensitive element in position for exposure and another housing section including a reflector mounted thereon for reflecting light toward the photosensitive element, means permitting positioning of a photosensitive element in supporting relation with the support means only when the reflector has been moved to a position away from the support member.

Another object of the invention is to provide in a camera of the foregoing type including a housing having a plurality of sections including a loading door or closure means coupled for movement between extended and folded positions and locking means for said loading door, release means for said locking means, said release means being mounted on one of said sections and adapted to be covered by at least a portion of another housing section when said sections are in the folded position to insure against operation of the release means and loading of the camera when said camera is in said folded position.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 1 is a perspective view, partly in section, of a camera embodying the invention shown in its extended or operative position with the loading door shown in the open position;

FIG. 2 is a perspective view, partly in section, of the camera shown in its folded position;

FIG. 3 is a fragmentary elevational view of one end of the camera shown in its folded position;

Figure 4:
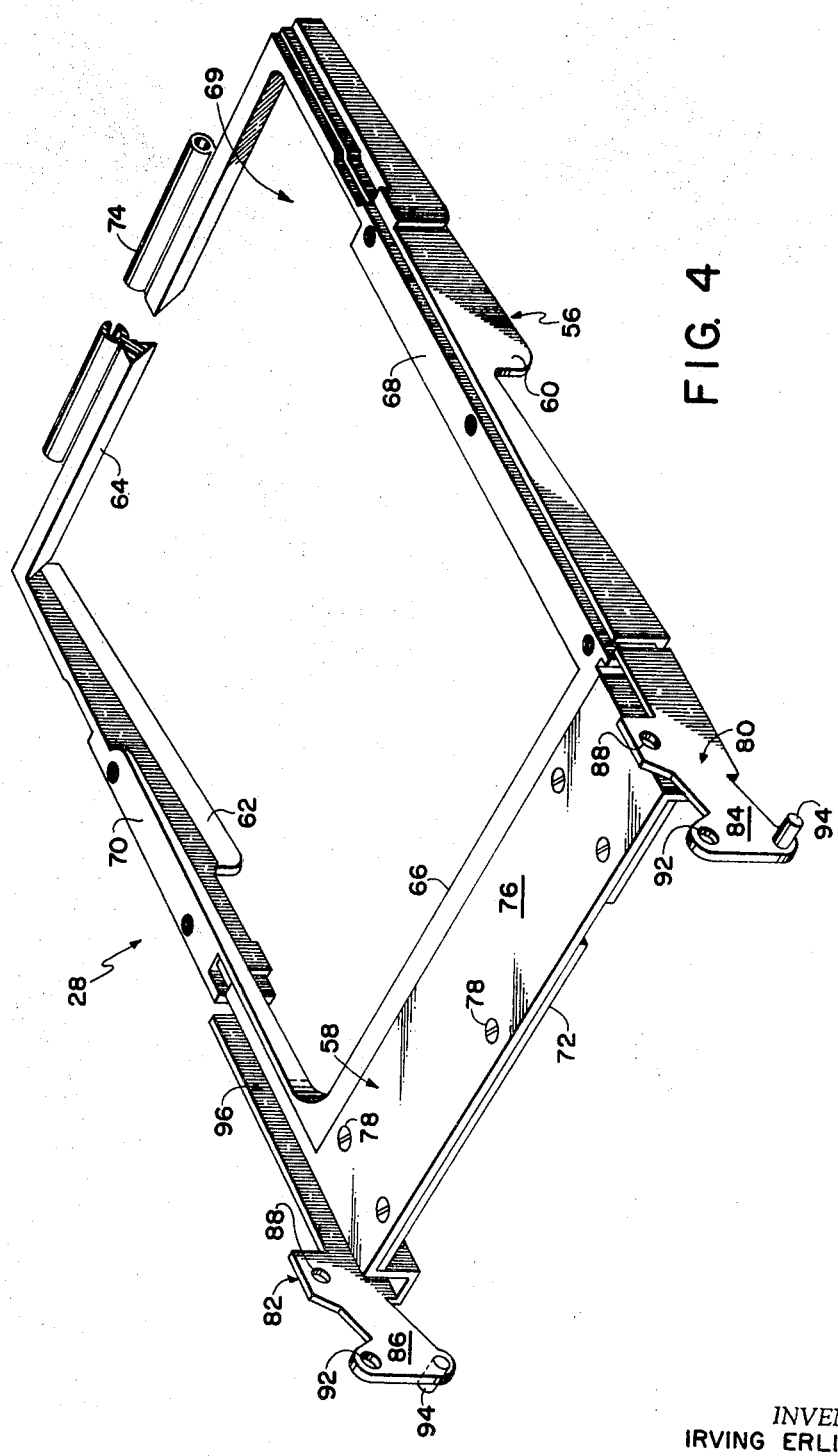
FIG. 4 is a perspective view, partly in section, of one of the components of the camera.

Reference is now made to FIGS. 1—5 of the drawings wherein is shown a preferred embodiment of the invention, more specifically, a folding camera of the self-developing type generally indicated by reference numeral 10. Camera 10 comprises a housing including a section 12; a section 14 having a reflecting means or reflector, e.g., a mirror 16, mounted thereon for directing light from the camera's lens toward a photosensitive element positioned for exposure adjacent section 12; a section 18 incorporating a lens and shutter assembly; a section or front cover 20 coupled near its ends to sections 14 and 18, respectively; and a flexible bellows 22.

Housing section 12 includes a rear wall 24, side walls 26 and a support member 28 for supporting and locating a photosensitive element in position for exposure. Wall 24, which functions as a loading door or closure means, is coupled near one end thereof to support member 28 and section 14 via pivot means 30 extending through sidewalls 26 to enable movement of wall 24 to a position in which a pack of film units or film container may be inserted into position in engagement with support member 28 as will be more clearly explained hereinafter.

Housing section 14 is provided with a slot 32 running along each side thereof and an outer wall including a planar portion having an outer surface disposed substantially in the same plane as the forward edges of sidewalls 26 when the camera is folded, so as to define a section of the forward wall of the folded camera and recessed sections 36 and 37 located near the end at which section 14 is pivotally connected to section 12 and cooperating with sidewalls 26 to provide, in the folded position of the camera, external recesses for receiving a rangefinder-viewfinder 38 pivotally mounted near the ends of a pair of erecting links 40.

Housing section 18 has a thickness dimension (measured along the optic axis) slightly less than the thickness of section 12 and is pivotally mounted at 42 to each side of support member 28. Section 18 is mounted between sidewalls 26 for pivotal movement between a folded position as shown in FIGS. 2 and 3 in which it is engaged between sidewalls 26 and covers a release means 50 (the function of which will be explained shortly) and an erect, operative position as shown in FIG. 1 in which section 18 is pivoted from the folded position through an angle of less than 90°, e.g., approximately 70°—75°, with respect to section 12. Section 18 includes an exposure system including an adjustable focus objective lens and shutter 44; a window 46 for admitting light to a photocell for controlling operation of the shutter; a focusing control 47; and a shutter release button 48 provided in that wall of housing section 18 which is uppermost in the erect position and constitutes an end wall of the camera in the folded position.

The camera is preferably of the self-developing type and is adapted for use with film units of the type shown and described in detail in the copending U.S. applications of Edwin H. Land, Ser. No. 622,287, and Edwin H. Land et al., Ser. No. 622,286, both filed Mar. 10, 1967, and generally referred to herein by reference numeral 52. Film units of this type each incorporates all of the materials necessary to produce a positive photographic print including a photosensitive element, a second or image-receiving element which is transparent and is secured in face-to-face relation with the photosensitive element, and a rupturable pod of processing liquid secured to one end of the photosensitive and second elements for dispensing its liquid contents therebetween in response to the application of compressive pressure to the pod. Each film unit is adapted to be processed by advancing the film unit 52, pod foremost, between a pair of pressure-applying members, e.g., a pair of rolls 54 mounted on section 12, which dispense the liquid contents of the pod therefrom between the photosensitive and second elements and spread the liquid between and in contact with the two elements toward the trailing edge thereof.

As stated above, section 12 includes a support member 28 for supporting a photosensitive element in position for exposure. Support member 28 (see FIG. 4) includes a generally rectangular portion 56 which may be formed from any suitable material such as plastic and a generally U-shaped member 58 formed from steel, for example. Rectangular portion 56 includes sidewalls 60 and 62 and end walls 64 and 66 which define an exposure opening 69. Each sidewall 60, 62 is provided with a reentrant flange 68, 70, respectively, the underside of which engages the forward wall of the film container 53 as it is moved upwardly (as viewed in FIG. 4) into engagement with the support member 28 to properly locate the forwardmost film unit in the container in position for exposure. The film container 53 is thus properly oriented with regard to the focal plane of the camera by the side and end walls and flanges 68 and 70. Means such as springs mounted on the interior surface of door 24 may be provided for urging the film container 53 toward support member 28. The forward surfaces (top surfaces as seen in FIG. 4) of flanges 68 and 70 also function as a mounting surface for bellows 22. Extending from wall 66 is a flange 72 which provides a means of attachment for U-shaped member 58. End wall 64 is provided with a knuckle 74 which cooperates with knuckles (not shown) on sections 12 and 14 for pivotally connecting support member 28 to sections 12 and 14.

U-shaped member 58 includes a base portion 76 which is attached to flange 72 by suitable means, e.g., screws 78, and U-shaped legs 80 and 82. The outer flange 84, 86 respectively, of each leg is provided with an opening 88 for receiving pins 90 (see FIG. 1) located near the lower end of each erecting link 40; an opening 92 for receiving pins 42 for pivotally connecting housing section 18 to support member 28; and shafts 94 which are part of a locking arrangement for releasably locking section 12 to support member 28. U-shaped leg 82 includes a channel 96 running along one side of rectangular member 56 for guiding and supporting a portion of a reciprocating means mounted in the camera which functions to remove a film unit 52 from the film container 53 subsequent to exposure. For a more detailed description of a means for removing a film unit from a container, reference is made to the copending application of Erlichman et al., U.S. Ser. No. 764,142, filed Aug. 16, 1968.

Folding cameras of the type described are usually loaded with a film container or pack containing a plurality of film units while the camera is in the folded position. As can be seen from a cursory view of FIG. 2, a portion of the film container 53 could protrude through the exposure opening 69 in support member 28 and contact and possibly scratch or crack the reflecting means 16 while the camera is in the folded position. In order to obviate this problem, a locking arrangement, generally indicated by reference numeral 100, is provided which insures that the reflecting means 16 is spaced from the film container supporting member 28 before the closure means 24 is opened. In other words, the camera cannot be loaded with a new film pack while the camera 10 is in the folded position.

Locking arrangement 100 is mounted substantially wholly within a recessed portion 102 of loading door 24 and is of a thickness substantially equal to or less than the depth of recess 102 in order to preserve the smooth surface of the interior surface of door 24 and to provide an uninterrupted path for the film unit to travel as it passes from the processing rolls 54 to the exterior of the camera. Recess 102 is covered by a thin plate 104 having an opening 106 therein for providing access to the release means 108 of the locking arrangement. Release means 108 includes a knurled portion 110 to facilitate operation thereof and is pivoted at 112 to the interior surface of door 24. An integral arm 113 extends toward a side of the camera and terminates in an upwardly turned end 114 having a recess 116 therein for receiving in locking engagement pin 94, mounted on U-shaped leg 80. On the opposite side of pivot 112 is a portion 118 having a recess 120 therein for pivotally receiving an end 122 of link 124. Link 124, which is pivotally coupled to door 24 at 126, includes a portion 128 extending toward the opposite side of camera 10 and terminating in an upwardly turned end 130 having a recess 132 therein for receiving in locking engagement therewith pin 94 mounted on U-shaped member 82. Link 124 is biased in a counterclockwise direction (as viewed in FIG. 5) by a spring 134 having one end held fast in a recess 136. Movement of link 128 in a counterclockwise direction causes release 108 to rotate in a clockwise manner until it abuts a limit stop 138. Each upwardly turned end 114 and 130 is provided with an inclined surface 135 which is engaged by a pin 94 as the sections are moved to the folded position and moved against the bias of spring 134 until the pin clears the inclined surface and enters the recess 116 or 132, respectively. In this latter position door 24 is locked against movement relative to support member 28.

As can be seen in FIGS. 2 and 3, when the camera is in the folded position, a portion of section 18 functions as a covering means by covering release means 108 such that the latter is inaccessible to the user of the camera, and reflecting means 16 is positioned closely adjacent and in overlying relation to the film container 53. Should it be desired to reload the camera with a new film pack, the rangefinder-viewfinder 38, which may broadly be considered to be part of the erecting system of the camera, is moved from the position shown in FIG. 2 toward the position shown in FIG. 1. This latter movement of rangefinder-viewfinder 38 causes erecting links 40 to pivot about pin 90 in a counterclockwise manner. Each link 40 has a pin (not shown) near its upper end (as viewed in FIG. 1) which rides in a groove 32 running along each side of section 14 to transmit motion to the latter for moving the various sections of the camera to the extended or erect position. Detent means (not shown) are provided for releasably maintaining the sections 12, 14, 18 and 20 in the erect position. In the erect position the shutter section 18 has been moved to a position wherein the release means 108 is now accessible to the user of the camera and the reflecting means 16 is spaced from support member 28. Actuation of release means 108 in the direction of the arrow will release door 24 from locking engagement with support member 28, thereby allowing the old film container to be removed and a new one inserted into engagement with the support member without fear of damaging the reflecting means 16.

Figure 6:
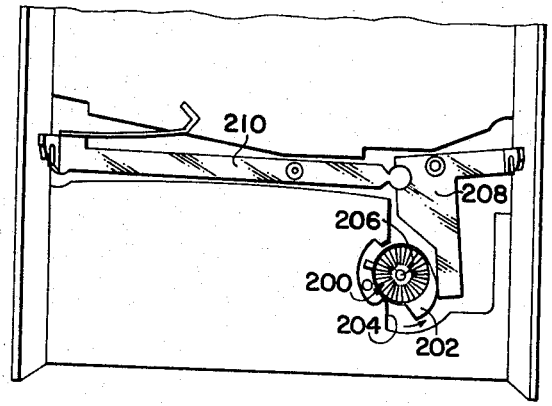
FIG. 6 is a fragmentary plan view of a modified locking arrangement.
Figure 5:
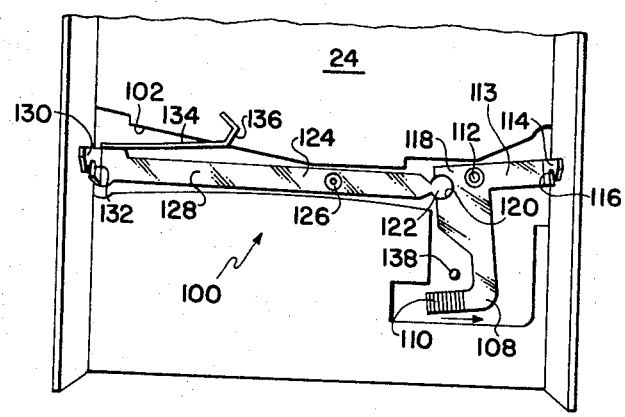
FIG. 5 is a fragmentary plan view of a locking arrangement utilized in the instant invention.

FIG. 6 shows a modified release means comprising a disc-shaped member 200 having a camming surface 202 around part of its periphery. Release means 200 is of a thickness substantially equal to or less than the depth of the recess 204 in which it rests and is actuated by placing the thumb of the user on top of member 200 and another finger on the exterior surface of door 24 and rotating member 200 about pivot 206 until camming surface 202 moves links 208 and 210 to the unlocking position in a manner similar to that described with reference to FIG. 5.

Although one wall, i.e., wall 24, of section 12 has been described as a closure means or loading door, it should be understood that only a portion of wall 24 need be pivoted relative to the remainder of the wall in order to serve its function as a closure means. Also, it is possible that the sections of the housing could be arranged such that portions of one or more sections could overlie the release means 108 in the camera's folded position.

From the foregoing it can be seen that there has been disclosed a camera of the folding type which utilizes a novel, inexpensive and reliable means for loading a film container into position for exposure. The loading can take place only when the camera is out of the folded position, thereby minimizing any damage that may occur to the folded elements of the camera upon insertion of the film container into the camera.

Since certain changes may be made in the above apparatus without departing from the scope of the invention herein involved, it is intended that all matter contained in the above description or shown in the accompanying drawings shall be interpreted as illustrative and not in a limiting sense.

What I claim is:

1. A compact folding camera comprising, in combination:
    a housing having a plurality of sections including a first section having support means for supporting a photosensitive element in position for exposure and at least a second section movably coupled to said first section for movement between an extended position and a folded position;
    closure means forming at least a portion of said first section, said closure means being movable between open and closed positions to permit loading of a photosensitive element into position with said support means; and
    locking means for releasably retaining said closure means in said closed position, said locking means being capable of actuation to release said closure means only when said sections are out of said folded position.

2. A folding camera as defined in claim 1 wherein said locking means is inaccessible when said sections are in the folded position.

3. A folding camera as defined in claim 2 wherein said camera includes covering means movable relative to said locking means to cover said locking means when said sections are in said folded position.

4. A folding camera as defined in claim 3 wherein said covering means comprise a portion of one of said sections of said housing.

5. A folding camera as defined in claim 3 wherein said locking means include latch means and release means, said covering means include at least a portion of one of said sections of said housing mounted for movement to a position overlying said release means to prevent operation of the latter when said sections are in the folded position.

6. A folding camera as defined in claim 5 including a third section movably coupled to said first and second sections for movement between said extended and folded positions, a lens mounted in said third section, said covering means including a portion of one of said first, second or third sections.

7. A folding camera as defined in claim 6 wherein said portion movable into a position overlying said release means is a portion of said third section.

8. A folding camera as defined in claim 6 wherein said first section includes at least one wall and said release means is mounted substantially wholly within a recess in a surface of said wall and substantially flush with said surface.

9. A folding camera as defined in claim 8 wherein said release means include a member having a knurled surface, and a linkage system connecting said member with said locking means for unlocking said locking means upon actuation of said member.